United States Patent [19]

Petrie

[11] 4,120,913
[45] Oct. 17, 1978

[54] EPOXY-AMINE ADHESIVE COMPOSITIONS

[75] Inventor: Edward M. Petrie, Wilkinsburg, Pa.

[73] Assignee: Westinghouse Electric Corp., Pittsburgh, Pa.

[21] Appl. No.: 749,593

[22] Filed: Dec. 10, 1976

[51] Int. Cl.$^2$ .................................... C08L 63/00
[52] U.S. Cl. .................................... 260/830 TW
[58] Field of Search .............. 260/830 TW, 47 EW; 427/195

[56] References Cited

U.S. PATENT DOCUMENTS

| | | | |
|---|---|---|---|
| 2,786,794 | 3/1957 | Gams | 428/454 |
| 2,828,236 | 3/1958 | West | 428/116 |
| 2,938,004 | 5/1960 | DeHoff | 260/2 |
| 3,631,125 | 12/1971 | Salensky | 260/830 R |
| 3,723,223 | 3/1973 | Le Compte | 260/830 TW |
| 3,842,035 | 10/1974 | Klaren | 260/47 EN |
| 3,860,541 | 1/1975 | Lehmann | 260/18 PN |

Primary Examiner—Theodore E. Pertilla
Attorney, Agent, or Firm—D. P. Cillo

[57] ABSTRACT

A composition, which is suitable for use as an adhesive, is made by mixing: (A) liquid epoxy resin and a stoichiometric excess of aromatic amine and (B) a reactive solid epoxy resin powder having an average particle size of from about 10 microns to about 420 microns, the mixture being capable of melting at temperatures of over about 60° C; wherein solid epoxy (B) is mixed with a liquid mixture of epoxy-amine (A) the components of (A) form a solid reaction product adduct after addition of epoxy (B), the epoxy of (B) remains unreacted until melting of the composition, and the weight ratio of solid epoxy resin:adduct is from about 1 to 6:1.

9 Claims, 1 Drawing Figure

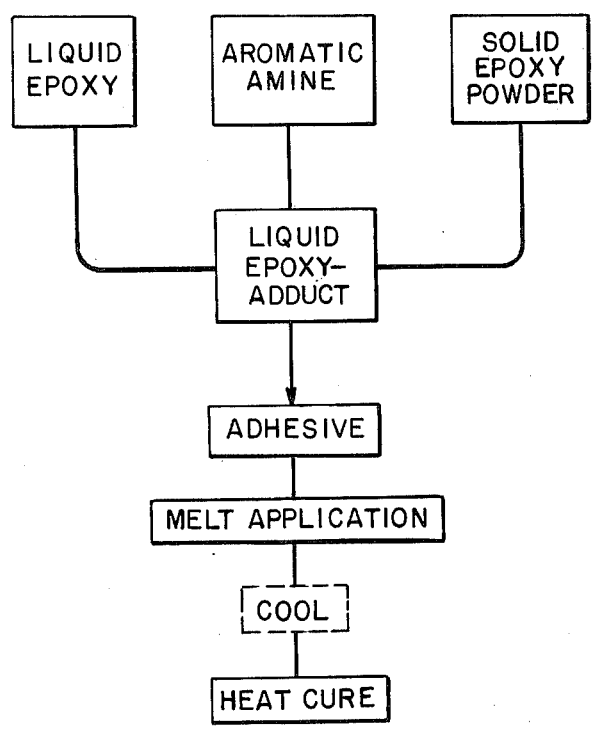

EPOXY-AMINE ADHESIVE COMPOSITIONS

BACKGROUND OF THE INVENTION

Amine curing agents for single component epoxy resin adhesives for plastics are well known in the art, as taught by West in U.S. Pat. No. 2,828,236. Lehmann et al., in U.S. Pat. No. 3,860,541, in order to improve curing times for epoxy adhesives, developed a composition containing a solid epoxy resin, and a solid curing agent consisting of the cooled admixture of an adduct of an epoxy resin with an aromatic or cycloaliphatic amine reacted at 80° C. to 200° C., and a liquid polyamine. The solid epoxy resin and the solid adduct-polyamine curing agent are mixed together to form an adhesive powder. This adhesive powder may be sprinkled on various fabrics or plastic sheets and hot rolled at about 80° C. to 130° C. to provide a cured adhesive film.

Cams et al., in U.S. Pat. No. 2,786,794, taught hot melt adhesives for metals. Metal adhesion presents special problems due to the low porosity of most metal surfaces. Cams et al., solved this problem by providing a solventless composition comprising an unreacted mixture of an epoxy resin and up to about 10 wt.% of a dicyandiamide or melamine and/or a polyamine such as ethylene-diamine, N:N-diethylene diamine or triethylene-tetramine as a hardening agent.

This unreacted composition can be formed into cold compressed solder sticks, which melt upon contact with hot metal surfaces, to form a very thin fluid which fills low porosity metal and glass surfaces. The composition can also be brushed onto the surfaces in molten, paste, or solution form. Hardening in Cams et al., is conducted by heating at between 100° C. to 200° C., while the surfaces are pressed together by a vise, clamp, or other pressing equipment which goes through the curing cycle with the metal and adhesive. Shear strengths of about 1,450 psi. are acheived.

What is needed, is an adhesive composition that can be formed into intricate shapes to match joint geometry, has a long shelf life, allows at least ½ to 2 minutes working time after melt application, cures at low temperatures, and which will provide joint shear strengths of at least about 1,000 psi. without requiring the use of pressing equipment. The elimination of clamps in the curing process would be particularly advantageous in any continuous, commercial, production line operation requiring metal to metal bonding.

SUMMARY OF THE INVENTION

The invention is a solid reactive mass comprising a uniform dispersion of from about 1 part to about 6 parts of a reactive epoxy resin powder, and 1 part of a curing agent consisting of a reaction product adduct consisting of liquid epoxy resin and a stoichiometric excess of a liquid aromatic amine or liquefied solid aromatic amine. The components are mixed and temperatures maintained effective to form the adduct yet not allow the epoxy powder to react. The material is an unreacted mixture of reactive epoxy resin powder and adduct, which can be used as an adhesive, and is capable of melting at temperatures of above about 60° C. and forming a cross linked adhesive material.

The adhesive has a long storage life and can be cold molded into pellets, rods, or intricate shaped design configurations. The cold molded adhesive can be melted on metal or glass substrates to be bonded, or applied with a hot melt gun apparatus with a zone heater in the nozzle, to form a single phase system. A second substrate is then placed in contact with the adhesive while it is in melted form. This adhesive, after melt application, can form a "thermoplastic" bond between the two substrates during cooling to room temperature. The adhesive is then fully cured to a thermoset state preferably by staged heating, to provide joint shear strengths between the substrates of about 1,900 psi.

In most of the above curing processes, clamps or other fixturing equipment are not necessary. Other advantages of the above-described materials and processes are: assembly speed and operational simplicity; once formed by cold pressing or other techniques into proper shapes to match the joint geometry, operators need not carry out processes and so would avoid possible dermatitis or fume emission problems.

This high performance structural adhesive will find applications in the wood, glass, plastics, fabrics, and metal joining industries. It can be applied in solid form to bond a variety of substrates such as plastics, metals such a tin, aluminum, iron, copper, etc., glass, composites and dissimilar materials. It can also be used to seal terminals and leads into plastic moldings and to encapsulate discrete components.

BRIEF DESCRIPTION OF THE DRAWING

For a better understanding of the invention, reference may be made to the preferred embodiments, exemplary of the invention, shown in the accompanying drawing, which shows a block flow diagram of a solid coating, optional cooling and final heating cure application of one embodiment of the adhesive of this invention.

DESCRIPTION OF THE PREFERRED EMBODIMENTS

One type of epoxide (epoxy resin) which may be used in the invention, is obtainable by reacting epichlorohydrin with a dihydric phenol in an alkaline medium at about 50° C., using 1 to 2 or more moles of epichlorohydrin per mole of dihydric phenol. The heating is continued for several hours to effect the reaction, and the product is then washed free of salt and base. The product, instead of being a single simple compound, is generally a complex mixture of glycidyl polyethers, but the principal product may be represented by the chemical structural formula:

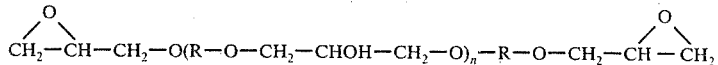

where $n$ is an integer of the series 0, 1, 2, 3 . . . , and R represents the divalent hydrocarbon radical of the dihydric phenol. Typically R is:

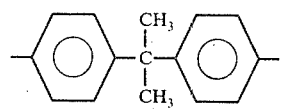

to provide a diglycidyl ether of bisphenol A type epoxide or

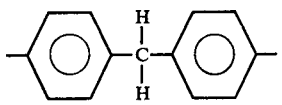

to provide a diglycidyl ether of bisphenol F type epoxide resin.

The bisphenol epoxides used in the invention have a 1, 2 epoxy equivalency greater than one. They will generally by diepoxides. Monoepoxides are not suitable because of poor cured tensile strength. By the epoxy equivalency, reference is made to the average number of 1, 2 epoxy groups,

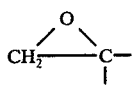

contained in the average molecule of the glycidylether. Typically, epoxy resins of bisphenol are readily available in commercial quantities and reference may be made to *The Handbook of Epoxy Resins*, by Lee and Neville for a complete description of their synthesis.

Other glycidylether resins that are useful in this invention include polyglycidylethers of a novolac. The polyglycidylethers of a novolac suitable for use in accordance with this invention are prepared by reacting an epihalohydrin with phenol formaldehyde condensates. While the bisphenol-based resins contain a maximum of two epoxy groups per molecule, the epoxy novolacs may contain as many as seven or more epoxy groups per molecule. In addition to phenol, alkyl-substituted phenols such as o-cresol may be used as a starting point for the production of epoxy novolac resins.

The product of the reaction is generally a massive oxidation resistant aromatic compound, one example of which is represented by the chemical structural formula;

particular resin divided by the mean number of epoxy radicals per molecule. In the present invention, the suitable solid bisphenol A and bisphenol F epoxides will have a preferred epoxy equivalent weight of from about 330 to 6,000; the suitable liquid bisphenol A and bisphenol F epoxides will have a preferred epoxy equivalent weight of from about 150 to 335; and the suitable epoxy-novolac resins are solids and will have a preferred epoxy equivalent weight of from about 170 to 220.

The adhesive composition of this invention is a dispersed mixture of a reactive epoxy resin powder; and a liquid epoxy resin, and a stoichiometric excess of a liquid aromatic amine, based on the liquid epoxy resin. The amine and the liquid epoxy are reacted to form a solid adduct, and the epoxy powder remains unreacted. Preferably, the components are mixed at the same time.

When liquids are used to provide the adduct, the solid epoxy powder is added simultaneously with the liquid epoxy and liquid amine, and all are mixed at a temperature below the melting point of the solid epoxy powder. In another embodiment of this invention, it is possible to liquefy a solid aromatic amine and then mix it with the liquid epoxy resin to form a liquid system to which the solid epoxy powder is added.

The epoxy resin powder is selected from diglycidyl ethers of bisphenol A epoxies, diglycidyl ethers of bisphenol F epoxies, novolac epoxies, and their mixtures. The epoxy resin powder must have an average particle size range of from about 10 microns to about 420 microns (40 mesh U.S. Screen No.), with a preferred range of from about 37 microns (400 mesh U.S. Screen No.) to about 230 microns (63 mesh U.S. Screen No.). Over about 420 microns diameter and there will be inadequate cross linking between the epoxy powder and the adduct on cure.

The adduct must contain a liquid epoxy resin selected from diglycidyl ethers of bisphenol A epoxies, diglycidyl ethers of bisphenol F epoxies, and their mixtures, having viscosities ranging from about 500 cps. to about 22,500 cps, at 25° C. Over about 22,500 cps. and the

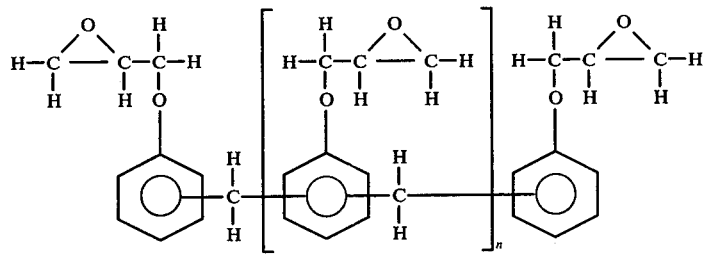

wherein *n* is an integer of the series 0, 1, 2, 3, etc.

Although epoxy novolac resins from formaldehyde are generally preferred for use in this invention, epoxy novolac resins from any other aldehyde such as, for example, acetaldehyde, chloraldehyde, butylaldehyde, fufuraldehyde, can also be used. Although the above formula shows a completely epoxidized novolac, other epoxy novolacs which are only partially epoxidized can be useful in this invention. An example of a suitable epoxy novolac is 2, 2, bis [p-(2,3-epoxypropoxy)-phenyl]-methane. These resins are well known in the art and reference may be made to *The Handbook of Epoxy Resins* for a complete description of their synthesis.

All of the above-described epoxy resins can be characterized by reference to their epoxy equivalent weight, which is defined as the mean molecular weight of the epoxy will not effectively react with the amine at low temperatures. The liquid aromatic diamine would include eutectic blends of metaphenylene diamine, orthophenylene diamine and 4 chloro orthophenylene diamine; phenylenediamine, m-phenylenediamine and 2,4-toluenediamine; phenylenediamine and N-methyl-p-phenylenediamine; phenylenediamine and N-methyl-o-phenylenediamine; phenylenediamine and diaminonaphthalene; phenylenediamine and toluenediamine; phenylenediamine, o-phenylenediamine and N-methyl-o-phenylenediamine; and phenylenediamine, p-phenylenediamine and N-methyl-p-phenylenediamine, and the like, but preferably a eutectic blend of about 60 wt.% to about 75 wt.% metaphenylene diamine and about 25 wt.% to about 40 wt.% methylene dianiline.

Solid aromatic amines can be used but they must first be converted to a low viscosity liquid by melting, eutectic blending, modification with diluents or the like, before they are mixed with the liquid epoxy resin to form the adduct. Useful solid aromatic diamines would include metaphenylene diamine; methylene dianiline; orthophenylene diamine; 4 chloro orthophenylene diamine; diaminodiphenyl sulfone; bis(3,4-diaminophenyl) sulfone; benzidine; 4,4'-thiodianiline; dianisidine; 2,4-toluenediamine; diaminoditolylsulfone; 2,6-diaminopyridine; 4-methyoxy-6-methyl-m-phenylenediamine; diaminodiphenyl ether; 4,4'-bis(o-toluidine); methylenebis(o-chloroaniline); m-aminobenzylamine and the like, and their mixtures.

The adduct curing agent will contain from about 0.20 part to about 1.5 parts liquid or liquefied solid amine for each 1 part by weight of epoxy resin in the adduct, to provide a suitable stoichiometric excess of amine. Less than about 0.20 part amine will allow premature cross linking of the adduct. Over about 1.5 part amine will excessively plasticize the adduct causing it to remain in the liquid state. Use of an aromatic amine is necessary so that the two liquid adduct components will react upon mixing to form a solid, reaction product adduct. This reaction does not require any heat and does not give off any heat. The solid adduct comprises long chain polymers having aromatic moieties which require a heat cure at elevated temperatures to provide complete curing to a thermoset state. This adduct provides the curing agent for these adhesive compositions and it is not further reacted with polyamines.

In this invention, the epoxy resin powder is preferably mixed simultaneously, at temperatures up to about 40° C. but preferably at 25° C. with the liquid epoxy and liquid aromatic amine components of the reaction product adduct. At these temperatures the adduct forms but the epoxy powder does not react. Here, after homogeneous mixing, the epoxy resin powder remains unreacted and the components are physically encapsulated forming a stable, two phase system of dispersed epoxy powder and adduct. The melting point of the epoxy powder must be above the reaction temperature of the adduct reaction, so that the epoxy powder will not cross link at this point. In the embodiment where liquid amine is used, the solid epoxy powder is mixed with a liquid blend of epoxy and amine.

In the embodiment where a solid aromatic amine is to be used, the solid amine is first melted, to form a liquid. The liquefied aromatic amine is then added to the liquid epoxy and mixed at a temperature of between about 35° C. and about 200° C. The liquid mixture of epoxy-amine is then cooled to a temperature of about 20° C. to about 40° C., at which point it still remains in liquid form, and the solid epoxy powder is stirred in. At this cooler temperature the solid epoxy powder will not melt and a stable, two phase dispersed system of epoxy powder and adduct will form.

In both embodiments, the melting point of the formed adduct must be close to the melting point of the epoxy powder, i.e., within (+ or −) about 1° C. to about 50° C., preferably within about 1° C. to about 25° C., of the melting point of the epoxy powder, so that both phases will melt at about the same temperature to allow cross linking on melt application and the lower melting component will not be degraded. The melting point of the epoxy powder must be between about 55° C. to about 225° C. From about 1 part to about 6 parts of reactive solid epoxy resin is used to 1 part by weight of combined liquid epoxy and liquid or liquefied aromatic amine.

At temperatures over about 60° C., generally between about 60° C. and about 225° C., and preferably at between about 75° C. and about 175° C., both phases of the composition melt, become compatible and capable of cross linking. On being applied to hot metal substrate joints and immediate cooling to room temperature, the adhesive can exhibit a joint shear strength of about 230 psi. At this point, while the adhesive is not completely cured and is in a "thermoplastic" adhesive state, there is active cross linking and sufficient strength to provide good handling characteristics.

Full adhesive cure, and complete cross linking can be achieved, in one method, by heating the bonded joint preferably for about 1 hour to about 3 hours at about 50° C. to about 65° C., followed by about ½ hour to about 2 hours at a temperature of about 120° C. to about 175° C., effective to cure the adhesive. The initial low temperature step is effective to allow the adhesive to pass through a flowable B-stage condition yet maintain sufficient strength so that the joint will not be disturbed during cure. This provides a metal to metal or glass bond which does not require lengthy cure schedules, excessive cure temperatures or any fixturing of the assembly, yet provides a final joint shear strength of about 1,900 psi.

In another method, the adhesive may be applied at temperatures over about 60° C.; and after both phases melt, the hot metal joints may then be clamped, and the temperature maintained at about 60° C., for about 1 hour to about 3 hours, followed by a final cure at about 120° C. to about 175° C. for ½ hour to 2 hours. If the adhesive is applied at temperatures of about 125° C., that temperature can be maintained with clamping until complete cure.

In the embodiments described above, if less than about 1 part of epoxy powder/part of adduct is used, there will be loss of physical and heat resistance properties of the adhesive. Over 6 parts of epoxy powder/part adduct will result in inadequate cross linking of the epoxy powder and adduct on cure. These materials combine the desirable characteristics of thermosetting epoxy resins — high cohesive and adhesive strengths, permanence, and chemical resistance — and fast, simple application and processing characteristics. Small amounts of pigments or filler particles, having an average particle size of from about 2 microns to about 420 microns, can be added to the above-described compositions as coloring agents, extenders, or property modifiers.

EXAMPLE 1

An epoxy composition was made from a mixture of epoxy powder and the adduct of a liquid epoxy and a liquid aromatic amine. The following reaction components were directly mixed together at 25° C. in a reaction vessel:80 parts by weight of a solid diglycidyl ether of bisphenol A resin having an epoxy equivalent weight of 450 to 550 and a Durran's melting point of 65° C. to 75° C. (sold commercially by Shell Chem. Co. under the Tradename Epon 1001) ground to have an average particle size of about 75 microns to 210 microns; 20 parts by weight of a liquid diglycidyl ether of bisphenol A resin having an epoxy equivalent weight of 175 to 195 and a viscosity at 25° C. of 500 cps. to 700 cps. and containing 11 wt.% butyl glycidyl ether diluent (sold commercially by Shell Chem. Co. under the Tradename Epon 815); and 20 parts by weight of a liquid eutectic aromatic amine blend of 60 wt.% to 75 wt.% of metaphenylene diamine and 25 wt.% to 40 wt.% of methylene dianiline (sold commercially by Shell Chem. Co. as Curing Agent Z).

This provided a stoichiometric excess of amine, 1 part amine/1 part liquid epoxy, since for stoichiometric balance 20 parts by weight of Curing Agent Z (Eq. wt.:38) is required to react with 100 parts by weight of Epon 815 (Epoxide Eq.:175 to 195). This composition provided 2 parts epoxy powder per part combined liquid epoxy and liquid aromatic amine.

This mixture of liquid epoxy and adduct was milled, for about 10 minutes at 25° C. until it was homogeneous. The adhesive gelled after about 7 hours standing at 25° C., and formed a glassy solid in approximately 16 hours. Before gelation the adhesive system had the consistency of a very thick, thixotropic paste which was formed in a variety of intricate shapes, as well as rods, pellets and balls. The exotherm generated by the Curing Agent Z and Epon 815 adduct reaction is so mild that a low melting point solid epoxy powder could be incorporated into the reaction without cross linking and curing the epoxy powder.

The type and amount of epoxy powder was chosen so that it could react completely with the adduct when they were both in their liquid states. However, because the powder is incorporated into the adhesive as a solid, it cannot react until both phases (epoxy and adduct) are subsequently made compatible and reactive through melt activation. The adhesive is, therefore, a two-phase material: the first phase is the epoxy-amine adduct and the second phase is sufficient epoxy powder to react with the adduct upon melting. The adduct is dispersed evenly throughout the epoxy powder, and the system is stable because of separation of the two solid phases and because of the low exotherm to form the adduct. When a sufficiently high temperature is later applied to melt both phases, the products are fluid and free to cross-link. The adduct had a melting point of 50° C. and the epoxy powder had a melting point of 71° C. The solid adhesive had a melting point of 72° C. to 85° C. as determined with a Fisher-Johns Melting Point Apparatus equipped with a microscopic eyepiece.

A solid rod of adhesive was applied to a 150° C. preheated 0.063 inch type 6061 aluminum panel by wiping it across the area to be bonded. The panel was treated prior to bonding by abrasion with a 120X grit aluminum oxide sanding belt followed by a solvent wash with acetone. Another preheated abraded panel was immediately mated with the adhesive melt on the coated substrate and the joint was allowed to cool to room temperature without pressure on the bond or any clamping means.

To determine the strength of the joint at this stage, ASTM D-1002 tensile-shear tests were conducted at 25° C. and 60° C. To achieve complete cross linking and cure, the joints were heated for 2 hours at 60° C., followed by 1 hour at 150° C. Completely cured aluminum-aluminum lap shear specimens were tested per ASTM D-1002 at 25° C. and 122° C. The results of these shear tests are reported in Table 1 below:

TABLE 1

| Shear Strength Before Complete Cure | | Shear Strength After Complete Cure | |
|---|---|---|---|
| 25° C | 60° C | 25° C | 122° C |
| 228 psi. | 201 psi. | 1,920 psi. | 1,073 psi. |

This adhesive was able to resist 80 psi. loads at 60° C. before final cure, exhibiting good creep resistance. This adhesive has sufficient shear strength and creep resistance to allow substantial handling throughout the cure cycle without the use of any fixturing. The adhesive thermosets to an excellent bond. Gel time of this adhesive was measured to determine the working time restrictions.

Gel time was determined by melting the adhesive in an aluminum dish on a preheated hot plate and measuring the time until the adhesive gelled. Gellation was the point at which the adhesive could not be transferred to a wooden probe because of insufficient flow. At 100° C., the adhesive remained fluid for approximately 7 minutes, and at 150° C., gel time was approximately 2½ minutes. These working times are easily within the limits of operator capability and make possible the use of hot melt application equipment. This adhesive is particularly useful where quick grab and fast handling strength is necessary.

The variety of adhesives described hereinabove can be made with bisphenol F epoxies, and the other epoxies and amines described as useful. They can be used to bond glass, plastics, other metals such as copper, tin, iron, etc., and many other materials. The drawing shows the flow diagram for the method of EXAMPLE 1.

I claim:

1. A method of making an adhesive composition comprising the steps of:
   (1) admixing, at a temperature of up to about 40° C.:
      (A) 1 part by weight of a liquid mixture consisting of a liquid epoxy resin, having a viscosity of from about 500 cps. to about 22,500 cps. at 25° C., selected from the group consisting of diglycidyl ethers of bisphenol A epoxy resins, diglycidyl ethers of bisphenol F epoxy resins and mixtures thereof, and about 0.20 part by weight to about 1.5 parts by weight of an amine selected from the group consisting of liquid aromatic diamines and liquefied solid aromatic diamines, to provide a stoichiometric excess of amine; with
      (B) a solid epoxy resin powder, selected from the group consisting of diglycidyl ethers of bisphenol A epoxy resins, diglycidyl ethers of bisphenol F epoxy resins, novolac epoxy resins and mixtures thereof, having a melting point of between about 55° C. to about 225° C. and an average particle size of between about 10 microns to about 420 microns; and
   (2) maintaining a temperature for the admixture of up to about 40° C., said temperature being effective to permit the liquid epoxy resin and the amine to react to form a solid reaction product adduct and effective to allow the solid epoxy resin powder to remain unreacted, wherein a stable, solid two phase system of dispersed epoxy powder and adduct is formed, where the weight ratio of solid epoxy resin powder:adduct is from about 1 to 6:1, and the melting point of the adduct is within about 1° C. to about 50° C. of the melting point of the epoxy resin powder.

2. The method of claim 1, wherein the aromatic amine is a liquid eutectic blend selected from the group consisting of metaphenylene diamine and methylene dianiline; metaphenylene diamine, orthophenylene diamine and 4 chloro orthophenylene diamine; phenylenediamine, m-phenylenediamine and 2,4-toluenediamine; phenylenediamine and N-methyl-p-phenylenediamine; phenylenediamine and N-methyl-o-phenylenediamine; phenylenediamine and diaminonphthalene; phenylenediamine and toluenediamine; phenylenediamine, o-phenylenediamine and N-methyl-o-phenylenediamine; and phenylenediamine, p-phenylenediamine and N-methyl-p-phenylenediamine.

3. The method of claim 1, wherein the aromatic amine is a liquid eutectic blend consisting of metaphenylene diamine and methylene dianiline.

4. The method of claim 1, wherein the aromatic amine is a liquefied solid aromatic amine selected from the group consisting of metaphenylene diamine; methylene dianiline; orthophenylene diamine; 4 chloro orthophenylene diamine; diaminodiphenyl sulfone; bis(3,4-diaminophenyl) sulfone; benzidine; 4,4'-thiodianiline; dianisidine; 2.4-toluenediamine; diaminoditolylsulfone; 2,6-diaminopyridine; 4-methoxy-6-methyl-m-phenylenediamine; diaminodiphenyl ether; 4,4'-bis(o-toluidine); methylenebis(o-chloroaniline); m-aminobenzylamine and mixtures thereof.

5. The method of claim 1, wherein the epoxy resin in (A) and (B) is a diglycidyl ether of bisphenol A.

6. The method of claim 2, wherein the solid adhesive composition components are physically encapsulated.

7. The method of claim 2, wherein the liquid epoxy resin, liquid amine and solid epoxy resin are admixed simultaneously at temperatures up to about 40° C.

8. The method of claim 4, wherein the solid epoxy resin is added to the liquid mixture of liquid epoxy resin and liquefied solid aromatic amine at temperatures below the melting point of the solid epoxy resin.

9. The method of claim 4, wherein the liquid epoxy and liquefied solid amine are admixed at a temperature of between about 35° C. and about 200° C.; cooled to a temperature of between about 20° C. to about 40° C. and then admixed with the solid epoxy resin.

* * * * *